US008582847B2

(12) United States Patent
Devadas et al.

(10) Patent No.: US 8,582,847 B2
(45) Date of Patent: Nov. 12, 2013

(54) SYSTEM FOR VERIFYING DATA INTEGRITY IN AN X-RAY IMAGING SYSTEM

(75) Inventors: Benita Devadas, South Barrington, IL (US); Darshan Mehta, Gilberts, IL (US); Thomas Ruggiero, Schaumburg, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 203 days.

(21) Appl. No.: 13/164,802

(22) Filed: Jun. 21, 2011

(65) Prior Publication Data
US 2012/0093386 A1    Apr. 19, 2012

Related U.S. Application Data

(60) Provisional application No. 61/394,389, filed on Oct. 19, 2010.

(51) Int. Cl.
  *G06K 9/00*    (2006.01)
(52) U.S. Cl.
  USPC .......................................................... 382/128
(58) Field of Classification Search
  None
  See application file for complete search history.

(56) References Cited

U.S. PATENT DOCUMENTS 5,097,327 A *   3/1992  Hasebe ........................... 348/25
7,239,759 B2    7/2007  Nam et al.
7,853,983 B2 * 12/2010  Abrutyn et al. ................... 726/2
2007/0220259 A1 *  9/2007  Pavlicic ........................ 713/176
2009/0064248 A1   3/2009  Kwan et al.
2010/0201780 A1   8/2010  Bennett et al.
2011/0126130 A1   5/2011  Lieb et al.

FOREIGN PATENT DOCUMENTS

EP        1586462 A2 * 10/2005

* cited by examiner

*Primary Examiner* — Stephen R Koziol
*Assistant Examiner* — Amandeep Saini
(74) *Attorney, Agent, or Firm* — Peter R. Withstandley

(57) ABSTRACT

An error detection system is used by an image processing subsystem for detecting error in processing medical image data by multiple sequential subsystems using an image data processor. The image data processor in the image processing subsystem analyzes data representing a medical image to identify a sequence identifier associated with a subsystem preceding the image processing subsystem of the multiple sequential subsystems and identifies a position of the image relative to other images in an image sequence comprising multiple consecutive images. The image data processor uses the identified sequence identifier to detect an error in response to identifying at least one of, an unreadable sequence identifier and a missing sequence identifier. The image data processor incorporates a sequence identifier, in image data representing an area of the image associated with the image processing subsystem and initiates generation of an alert message in response to a detected error.

18 Claims, 3 Drawing Sheets

US 8,582,847 B2

SYSTEM FOR VERIFYING DATA INTEGRITY IN AN X-RAY IMAGING SYSTEM

This is a non-provisional application of provisional application Ser. No. 61/394,389 filed Oct. 19, 2010, by B. Devadas et al.

FIELD OF THE INVENTION

This invention concerns an error detection system for use by an image processing subsystem for detecting error in processing medical image data by multiple sequential subsystems.

BACKGROUND OF THE INVENTION

An x-ray imaging system includes multiple hardware and software subsystems which acquire, process, display, store and distribute sequences of images. These images are processed by an image data processing chain comprising different subsystems. Various subsystems use multiple buffering schemes to achieve real time throughput at higher frame rate (greater than 30 frames per second (fps)). At such a higher frame rate, it is difficult to detect out of sequence data or data loss in an acquired image sequence when the sequence is reviewed on a display. A data loss or out of sequence data may potentially impair patient safety by leading to an incorrect diagnosis. A system according to invention principles addresses these deficiencies and related problems.

SUMMARY OF THE INVENTION

A system verifies data integrity in an X-ray image representative data processing system by detecting out of sequence image data and data loss in different parts of the image data processing system. An error detection system is used by an image processing subsystem for detecting error in processing medical image data by multiple sequential subsystems using an image data processor. The image data processor in the image processing subsystem analyzes data representing a medical image to identify a sequence identifier associated with a subsystem preceding the image processing subsystem of the multiple sequential subsystems and identifies a position of the image relative to other images in an image sequence comprising multiple consecutive images. The image data processor uses the identified sequence identifier to detect an error in response to identifying at least one of, an unreadable sequence identifier and a missing sequence identifier. The image data processor incorporates a sequence identifier, in image data representing an area of the image associated with the image processing subsystem and initiates generation of an alert message in response to a detected error.

DETAILED DESCRIPTION OF THE INVENTION

A system detects data loss and out of sequence data in an image representative data processing chain. In the system an image source subsystem that outputs image data embeds a sequence identifier (id) and timestamp in the image data at a predetermined offset position in the image data. Each subsequent receiving subsystem in the imaging chain verifies data integrity in the image chain by reading the sequence id and timestamp that was embedded by a predecessor subsystem. During image data verification, in an image data buffering process, a subsystem verifies data integrity in its buffers by checking sequence id and timestamp. If verification is successful, the subsystem embeds its own sequence id and timestamp for a subsequent receiving subsystem to verify. If verification is unsuccessful, an error message is generated by this subsystem identifying the particular error with data supporting identifying a cause of the error.

Figure 1:
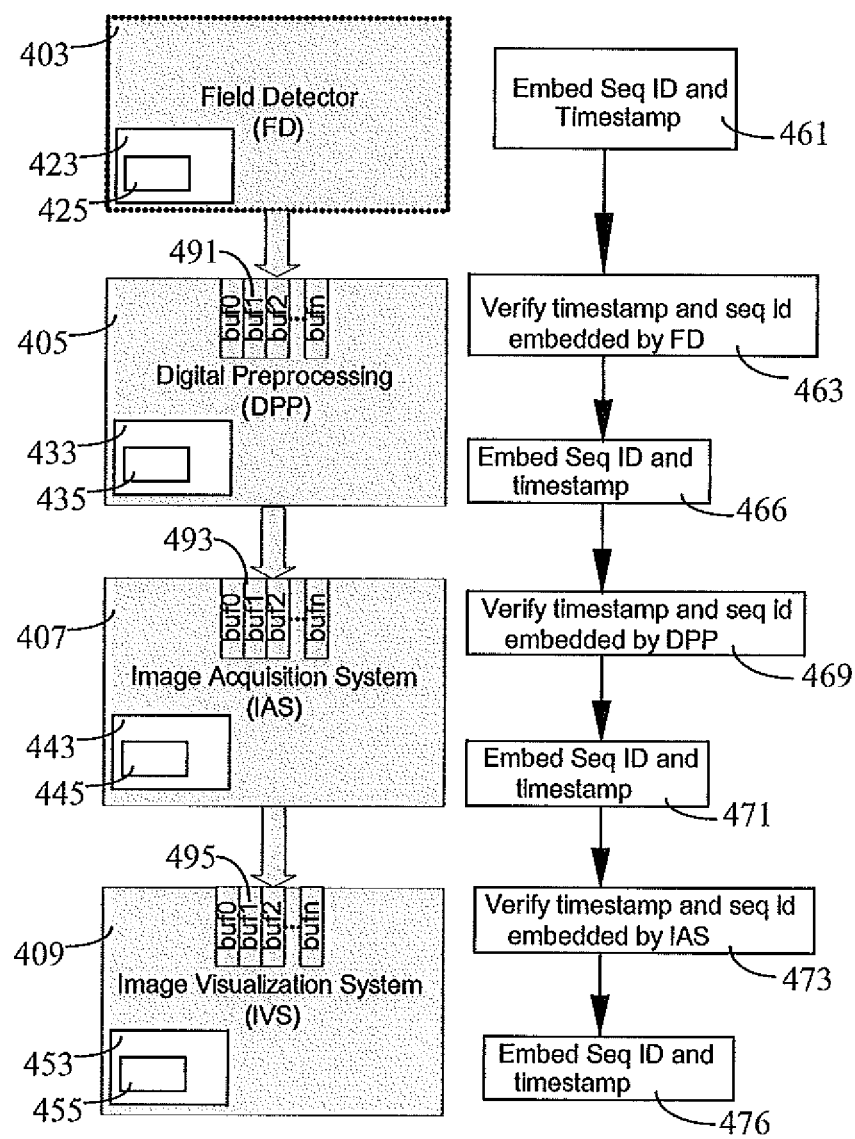
FIG. 1 shows an error detection system used by an image processing subsystem for detecting error in processing medical image data by multiple sequential subsystems and an associated flowchart of a process employed by a system for verifying data integrity in an image chain, according to invention principles.

FIG. 1 shows error detection systems 423, 433, 443 and 453 used by corresponding multiple sequential image processing subsystems 403, 405, 407 and 409 for detecting error in processing medical image data by the subsystems. Individual image data processors 435, 445 and 455 in corresponding image processing subsystems 405, 407 and 409 analyze data representing a medical image to identify a sequence identifier associated with a subsystem preceding the image processing subsystem of the multiple sequential subsystems and identifies a position of the image relative to other images in an image sequence comprising multiple consecutive images. Individual image data processors 435, 445 and 455 use the identified sequence identifier to detect an error in response to identifying at least one of, an unreadable sequence identifier and a missing sequence identifier. Individual image data processors 435, 445 and 455 incorporate a sequence identifier, in image data representing an area of the image associated with respective corresponding associated image processing subsystems. Individual image data processors 435, 445 and 455 initiate generation of an alert message in response to a detected error.

In the flowchart of a process employed by system 10 for verifying data integrity in an image chain, Field Detector image processing subsystem 403 acquires image data and in step 461 image data processor 425 in error detection system 423 incorporates a sequence id and timestamp in a predetermined position in a blank line or other non-active particular video area of the image data that uniquely associates the image data with subsystem 403 and identifies a position of the image acquired in a sequence of images being acquired and time of acquisition of the image. Digital subsystem 405 pre-processes image data acquired from subsystem 403 and stores image data acquired from subsystem 403 in buffers 491 and in step 463, image data processor 435 in error detection system 433 in performing buffering, verifies image data integrity by reading the sequence id and timestamp that was incorporated by subsystem 403 in image data acquired from subsystem 403. Processor 435 verifies image data integrity in buffers 491 by comparing sequence id and timestamp with corresponding sequence id and timestamps of sequential preceding images to determine timestamp difference and change in sequence between successively buffered images. Processor 435 compares the timestamp difference with a predetermined range of expected time difference and compares change in sequence with a predetermined expected sequence change where the expected value data is stored in a repository in unit 433.

In response to a successful comparison indicating the stored image data acquired from subsystem 403 is in sequence, processor 435 in step 466 incorporates a sequence id and timestamp in a predetermined position in a blank line or other non-active particular video area of the image data that uniquely associates the image data with subsystem 405 and identifies a position of the image acquired in a sequence of images being acquired and time of processing of the image by subsystem 405, In response to an unsuccessful comparison indicating the stored image data acquired from subsystem 403 is out of sequence, processor 435 generates an error message identifying the particular subsystem associated with the error supporting identifying a cause of the error.

Image acquisition subsystem 407 processes image data acquired from subsystem 405 and stores image data acquired from subsystem 405 in buffers 493 and in step 469, image data processor 445 in error detection system 443 in performing buffering, verifies image data integrity by reading the sequence id and timestamp that was incorporated by subsystem 405 in image data acquired from subsystem 405. Processor 445 verifies image data integrity in buffers 493 by comparing sequence id and timestamp with corresponding sequence id and timestamps of sequential preceding images to determine timestamp difference and change in sequence between successively buffered images. Processor 445 compares the timestamp difference with a predetermined range of expected time difference and compares change in sequence with a predetermined expected sequence change where the expected value data is stored in a repository in unit 443.

In response to a successful comparison indicating the stored image data acquired from subsystem 405 is in sequence, processor 445 in step 471 incorporates a sequence id and timestamp in a predetermined position in a blank line or other non-active particular video area of the image data that uniquely associates the image data with subsystem 407 and identifies a position of the image acquired in a sequence of images being acquired and time of processing of the image by subsystem 407. In response to an unsuccessful comparison indicating the stored image data acquired from subsystem 405 is out of sequence, processor 445 generates an error message identifying the particular subsystem associated with the error supporting identifying a cause of the error.

Image acquisition subsystem 409 processes image data acquired from subsystem 407 and stores image data acquired from subsystem 407 in buffers 495 and in step 473, image data processor 455 in error detection system 453 in performing buffering, verifies image data integrity by reading the sequence id and timestamp that was incorporated by subsystem 407 in image data acquired from subsystem 407. Processor 455 verifies image data integrity in buffers 495 by comparing sequence id and timestamp with corresponding sequence id and timestamps of sequential preceding images to determine timestamp difference and change in sequence between successively buffered images. Processor 455 compares the timestamp difference with a predetermined range of expected time difference and compares change in sequence with a predetermined expected sequence change where the expected value data is stored in a repository in unit 453.

In response to a successful comparison indicating the stored image data acquired from subsystem 407 is in sequence, processor 455 in step 476 incorporates a sequence id and timestamp in a predetermined position in a blank line or other non-active particular video area of the image data that uniquely associates the image data with subsystem 409 and identifies a position of the image acquired in a sequence of images being acquired and time of processing of the image by subsystem 409. In response to an unsuccessful comparison indicating the stored image data acquired from subsystem 407 is out of sequence, processor 455 generates an error message identifying the particular subsystem associated with the error supporting identifying a cause of the error.

In another embodiment, image data processors 425, 435, 445 and 455 process images by incorporating a sequence id and timestamp in an active video area but in a test mode and so do not compromise patient clinical video data used for clinical interpretation. In a further test mode embodiment, at least one configuration processor (not shown to preserve drawing clarity) in one or more units 423, 433, 443 and 453 provides test mode settings to subsystems 403, 405, 407 and 409 used for an imaging study of a selected particular anatomical organ or feature specific executable application. The configuration processor (e.g. executable application) distributes X-ray parameters and image chain settings to the subsystems in the image chain. In this test mode, each subsystem disables processing of clinical image data to ensure validity of embedded sequence id and timestamps in the test mode.

In one embodiment, system 10 activates a setting in an organ specific image processing executable application. The organ specific application distributes X-ray parameters and image chain settings to the subsystems in the image chain. In a test mode, individual subsystems disable processing of clinical image data during determination of validity of embedded sequence id and timestamp. In another embodiment, image data integrity is validated during normal non-test clinical operation without writing a sequence id and timestamp in the live image content. In this embodiment, Field Detector image processing subsystem 403 (and other subsystems) appends an extra line to the bottom area of an image. The extra line is used by various subsystems to incorporate sequence id and timestamp. The extra line is ignored by subsystems in normal image processing. At the time of storage of images in DICOM format, the extra line is extracted from the pixel data and stored as a per frame DICOM private attribute (comprising timestamps and sequence id from various subsystems). An image data processor in system 10 performs image data verification using the private per frame DICOM attributes.

Figure 2:
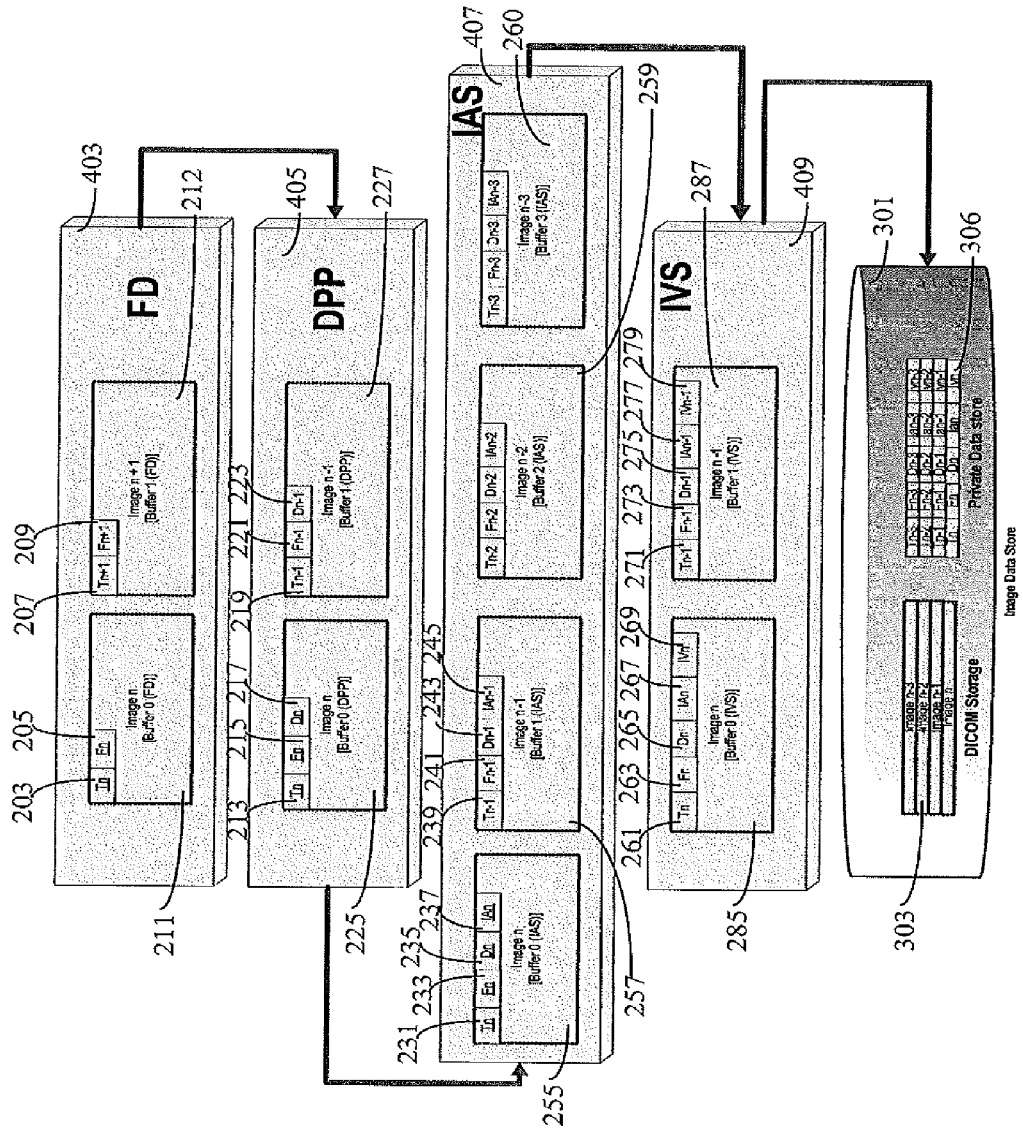
FIG. 2 shows transfer of an image through an image processing system comprising image processing subsystems employing an error detection system, according to invention principles.

FIG. 2 shows transfer of an image through image processing system 10 (FIG. 1) comprising image processing subsystems employing error detection and data integrity verification systems. Field Detector image processing subsystem 403 acquires image data from a radiation detector. Subsystem 403 records the time $T_n$ 203 at which image n was acquired and records an image sequence id $F_n$ 205 identifying the position of a particular image in a succession of consecutive images. $T_n$ 203 and $F_n$ 205 are written into a predetermined protected area of first FD image buffer 211. Subsystem 403 records the time $T_{n+1}$ 207 that image n+1 was acquired and an associated image sequence id $F_{n+1}$ 209 by writing this information into its assigned predetermined protected area of second FD image buffer 212. Image data processor 425 in error detection system 423 verifies timestamp $T_{n+1}$ is greater than $T_n$ and verifies sequence id is incrementally greater e.g., $F_{n+1}=F_n+1$. In response to a failed verification, image data processor 425 records data identifying the error in a repository in system 423 and generates an alert message.

Digital subsystem 405 acquires image data from radiation detector subsystem 403 and records a current image sequence id $D_n$ 217 generated by digital subsystem 405 by writing this information into its assigned particular protected area of unit 405 first image buffer 225 together with the previously written acquired time $T_n$ 213 and image sequence id $F_n$ 215 for use by subsystem 407 for verification. Digital subsystem 405 records a current image sequence id $D_{n-1}$ 223 generated by digital subsystem 405 by writing this information into its assigned particular protected area of image buffer 227 together with a previously written acquired time $T_{n-1}$ 219 and image sequence id $F_{n-1}$ 221. Image data processor 435 in error detection system 433 verifies timestamp $T_n$ is greater than a timestamp $T_{n-1}$ of a previously acquired image and verifies sequence id of an image is incrementally greater than that of a previous image, e.g., $F_n=F_{n-1}+1$. Thereby subsystem 405 receives an image from FD subsystem 403 and verifies the FD timestamp of the received image by comparing the timestamp with a previously acquired image timestamp and verifies an FD Frame sequence for the received image by comparing FD sequence id with the id of a previously acquired image. Subsystem 405 verifies the sequence ids in the buffers 225, 227 that it manages are in correct sequence, e.g. Buffer 225 receives image n but because of dual buffering, buffer 227 can have image n+1 or image n−1. In response to failed verification, image data processor 435 records data identifying the error in a repository in system 433 and generates an alert message.

Image acquisition subsystem 407 acquires image data from Digital subsystem 405 and records a current image sequence id $IA_n$ 237 generated by subsystem 407 by writing this information into its assigned particular protected area of first image buffer 255 together with the previously written acquired time $T_n$ 231 and image sequence id $F_n$ 233 and image sequence id $D_n$ 235 for use by subsequent subsystem 409 for verification. Image acquisition subsystem 407 records a current image sequence id $IA_{n-1}$ 245 generated by digital subsystem 407 by writing this information into its assigned particular protected area of image buffer 257 together with a previously written acquired time $T_{n-1}$ 239 and image sequence id $F_{n-1}$ 241 and image sequence id $D_{n-1}$ 243. Image data processor 445 in error detection system 443 verifies timestamp $T_n$ is greater than a timestamp $T_{n-1}$ of a previously acquired image and verifies sequence id of an image is incrementally greater than that of a previous image, e.g., $F_n=F_{n-1}+1$ and verifies sequence id of an image is incrementally greater than that of a previous image, e.g., $D_n=D_{n-1}+1$. Thereby subsystem 407 receives an image from subsystem 405 and verifies that the unit 405 timestamp in the received image by comparing the timestamp with a previously acquired image timestamp and verifies a unit 407 sequence for the received image by comparing a unit 407 sequence id with the id of a previously acquired image. Subsystem 407 verifies the sequence ids in the buffers 255, 257 that it manages are in correct sequence, e.g., buffer 255 receives image n but because of quad buffering (buffers 255, 257, 259, 260), buffer 257 can have image sequence ids in the range n+3 or n−3. In response to failed verification, image data processor 445 records data identifying the error in a repository in system 443 and generates an alert message.

Image visualization subsystem 409 acquires image data from image acquisition subsystem 407 and records a current image sequence id $IV_n$ 269 generated by subsystem 409 by writing this information into its assigned particular protected area of first image buffer 285 for use by a subsequent subsystem for verification and together with the previously written acquired time $T_n$ 261, image sequence id $F_n$ 263, an image sequence id $D_n$ 265 and an image sequence id $IA_n$ 267. Image visualization subsystem 409 records a current image sequence id $IV_{n-1}$ 279 generated by digital subsystem 409 by writing this information into its assigned particular protected area of image buffer 287 together with a previously written acquired time $T_{n-1}$ 271, image sequence id $F_{n-1}$ 273, image sequence id $D_{n-1}$ 275 and image sequence id $IAS_{n-1}$ 277. Image data processor 455 in error detection system 453 verifies timestamp $T_n$ is greater than a timestamp $T_{n-1}$ of a previously acquired image, verifies a sequence id of an image is incrementally greater than that of a previous image, e.g., $F_n=F_{n-1}+1$, verifies another sequence id of an image is incrementally greater than that of a previous image, e.g., $D_n=D_{n-1}+1$ and verifies a further sequence id of an image is incrementally greater than that of a previous image, e.g., $IA_n=IA_{n-1}+1$. Thereby subsystem 409 receives an image from subsystem 407 and verifies the unit 407 timestamp of the received image by comparing the timestamp with a previously acquired image timestamp and verifies a unit 409 sequence for the received image by comparing a unit 409 sequence id with the id of a previously acquired image. Subsystem 409 verifies the sequence ids in the buffers 285, 287 that it manages are in correct sequence, e.g., buffer 285 receives image n but because of dual buffering, buffer 287 can have image sequence ids in the range n+1 or n−1. In response to failed verification, image data processor 455 records data identifying the error in a repository in system 453 and generates an alert message.

Image visualization subsystem 409 provides processed image data including timestamp $T_{n-1}$ and sequence ids $F_{n-1}$, $D_{n-1}$, $IAS_{n-1}$ and $IV_{n-1}$ to data store 301. Data store 301 extracts the timestamp and sequence ids from the received processed image data and stores the timestamp and sequence ids in private part 306 of a DICOM image data structure. Thereby data store 301 preserves data integrity related watermarks from being corrupted during image data post-processing operations performed on an image sequence so they are available for subsequent use. Data store 301 stores image data in DICOM storage unit 303.

Figure 3:
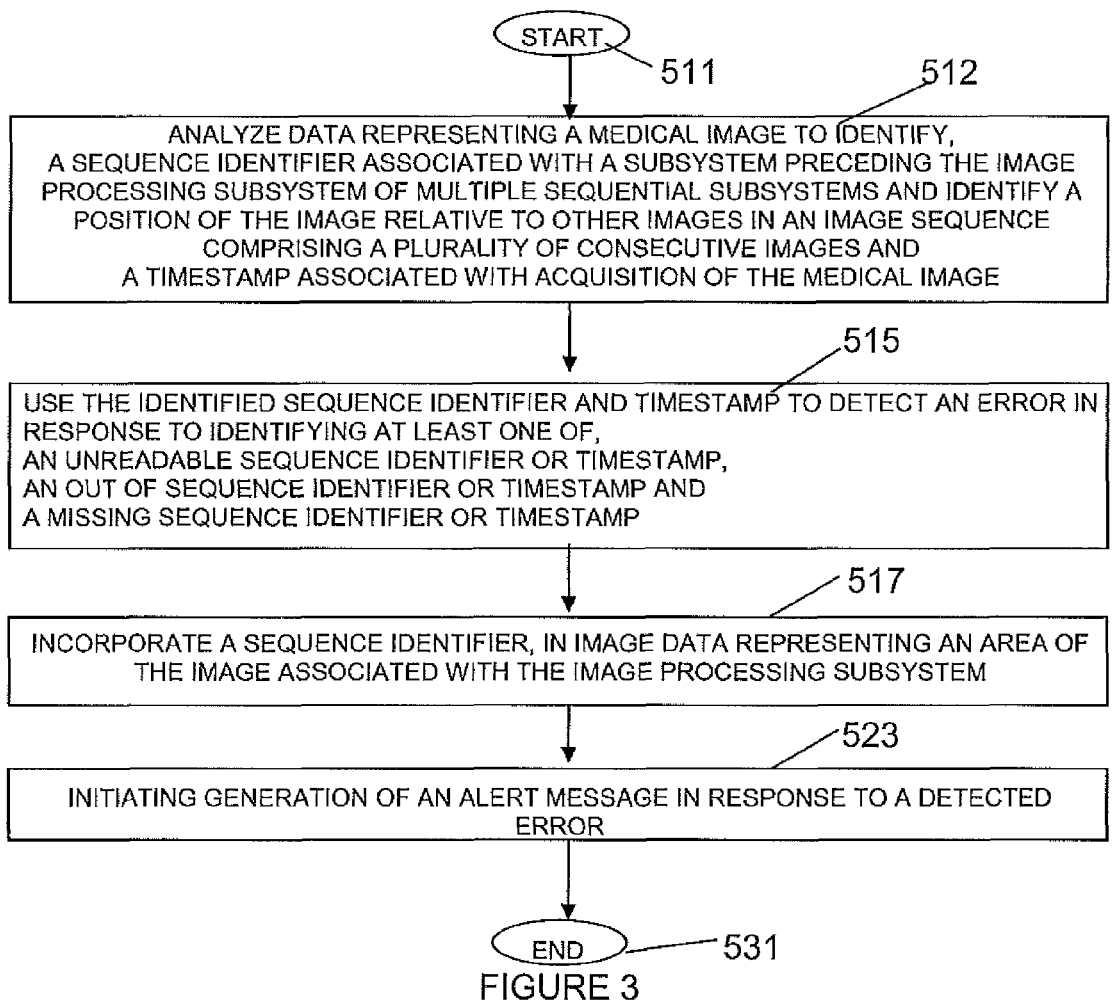
FIG. 3 shows a flowchart of a process used by an error detection system employed by an image processing subsystem for detecting error in processing medical image data by multiple sequential subsystems, according to invention principles.

FIG. 3 shows a flowchart of a process used by an error detection system employed by an image processing subsystem for detecting error in processing medical image data by multiple sequential subsystems. In step 512 following the start at step 511 an image data processor (e.g., processor 435 FIG. 1) in image processing subsystem 405, analyzes data representing a medical image (an image frame) to identify, a sequence identifier (or a timestamp) associated with subsystem 403 preceding image processing subsystem 405 of multiple sequential subsystems and identifying a position of the image relative to other images in an image sequence comprising multiple consecutive images, The image data processor also analyzes the data representing the medical image to identify a timestamp associated with acquisition of the medical image. The sequence identifier associated with a subsystem preceding the image processing subsystem and the sequence identifier associated with the image processing subsystem are in image data representing different areas of the image that are predetermined to be associated with specific corresponding image processing subsystems. In one embodiment the sequence identifier comprises a time stamp identifying a time of acquisition of the image relative to other images in the image sequence comprising the multiple consecutive images.

In a further embodiment, the image processing subsystem includes multiple buffers for storing corresponding multiple images and the different areas of the image are predetermined to be associated with specific corresponding buffers of the image processing subsystem and are the same for all the buffers within a subsystem. In step 515 the image data processor uses the identified sequence identifier and timestamp to detect an error in response to identifying at least one of, an unreadable sequence identifier or timestamp, an out of sequence identifier (identifying out of sequence images) or timestamp and a missing sequence identifier or timestamp. Further, the image data processor uses the identified sequence identifier or timestamp to detect an error associated with a particular buffer of the image processing subsystem. The image data processor in step 517 incorporates a sequence identifier (and in one embodiment a timestamp), in image data representing an area of the image associated with the image processing subsystem. In step 523 the image data processor initiates generation of an alert message in response to a detected error. The process of FIG. 3 terminates at step 531.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication therebetween. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-3 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. A subsystem incorporates a sequence identifier (id) and timestamp in image data at a predetermined position in the image data and subsequent image receiving subsystems in the imaging chain verify data integrity in the image chain using the sequence id and timestamp. Further, the processes and applications may, in alternative embodiments, be located on one or more (e.g., distributed) processing devices on a network linking the units of FIG. 1. Any of the functions and steps provided in FIGS. 1-3 may be implemented in hardware, software or a combination of both.

What is claimed is:

1. An error detection system for use by an image processing subsystem for detecting error in processing medical image data by a plurality of sequential subsystems, comprising:
   an image data processor in said image processing subsystem for,
      analyzing data representing a medical image to identify a sequence identifier associated with a subsystem preceding said image processing subsystem of said plurality of sequential subsystems and identifying a position of the image relative to other images in an image sequence comprising a plurality of consecutive images;
      using the identified sequence identifier to detect an error in response to identifying at least one of,
         an unreadable sequence identifier and
         a missing sequence identifier;
      incorporating a sequence identifier, in image data representing an area of the image associated with said image processing subsystem; and
      initiating generation of an alert message in response to a detected error.

2. A system according to claim 1, wherein said sequence identifier comprises a time stamp identifying a time of acquisition of the image relative to other images in said image sequence comprising said plurality of consecutive images.

3. A system according to claim 1, wherein said image data processor uses the identified sequence identifier to detect an error in response to identifying out of sequence images.

4. A system according to claim 1, wherein said image data processor,
   analyzes data representing said medical image to identify a time stamp associated with a subsystem preceding said image processing subsystem of said plurality of sequential subsystems and identifying a position of the image relative to other images in an image sequence comprising a plurality of consecutive images, said time stamp identifying a time of acquisition of the image relative to other images in said image sequence comprising said plurality of consecutive images and
   uses the identified time stamp to detect an error in response to identifying at least one of, an unreadable time stamp,
a missing time stamp and
out of sequence images.

5. A system according to claim 1, wherein
said sequence identifier associated with a subsystem preceding said image processing subsystem and said sequence identifier associated with said image processing subsystem are in image data representing different areas of the image.

6. A system according to claim 5, wherein
said different areas of the image are predetermined to be associated with specific corresponding image processing subsystems.

7. A system according to claim 5, wherein
an image comprises an image frame,
said image processing subsystem includes a plurality of buffers for storing a plurality of images and
said different areas of the image are predetermined to be associated with specific corresponding buffers of said image processing subsystem.

8. A system according to claim 7, wherein
said different areas of the image are predetermined and are the same for all the buffers within a subsystem.

9. A system according to claim 1, wherein
said image processing subsystem includes a plurality of buffers storing a corresponding plurality of images and
said image data processor uses the identified sequence identifier to detect an error associated with a particular buffer of said image processing subsystem.

10. An error detection system for use by an image processing subsystem for detecting error in processing medical image data by a plurality of sequential subsystems, comprising:
an image data processor in said image processing subsystem for,
analyzing data representing a medical image to identify,
a sequence identifier associated with a subsystem preceding said image processing subsystem of said plurality of sequential subsystems and identifying a position of the image relative to other images in an image sequence comprising a plurality of consecutive images and
a timestamp associated with acquisition of said medical image;
using the identified sequence identifier and timestamp to detect an error in response to identifying at least one of,
an unreadable sequence identifier or timestamp,
an out of sequence identifier or timestamp and
a missing sequence identifier or timestamp;
incorporating a sequence identifier, in image data representing an area of the image associated with said image processing subsystem; and
initiating generation of an alert message in response to a detected error.

11. A system according to claim 10, wherein
said image data processor uses the identified sequence identifier to detect an error in response to identifying out of sequence images.

12. A system according to claim 10, wherein
said sequence identifier associated with a subsystem preceding said image processing subsystem and said sequence identifier associated with said image processing subsystem are in image data representing different areas of the image.

13. A system according to claim 12, wherein
said different areas of the image are predetermined to be associated with specific corresponding image processing subsystems.

14. A system according to claim 12, wherein
an image comprises an image frame,
said image processing subsystem includes a plurality of buffers for storing a plurality of images and
said different areas of the image are predetermined to be associated with specific corresponding buffers of said image processing subsystem.

15. A system according to claim 14, wherein
said different areas of the image are predetermined and are the same for all the buffers within a subsystem.

16. A system according to claim 10, wherein
said image processing subsystem includes a plurality of buffers storing a corresponding plurality of images and
said image data processor uses the identified sequence identifier to detect an error associated with a particular buffer of said image processing subsystem.

17. A method for use by an image processing subsystem for detecting error in processing medical image data by a plurality of sequential subsystems, comprising the activities of:
in said image processing subsystem,
analyzing data representing a medical image to identify a sequence identifier associated with a subsystem preceding said image processing subsystem of said plurality of sequential subsystems and identifying a position of the image relative to other images in an image sequence comprising a plurality of consecutive images;
using the identified sequence identifier to detect an error in response to identifying at least one of,
an unreadable sequence identifier and
a missing sequence identifier;
incorporating a sequence identifier, in image data representing an area of the image associated with said image processing subsystem; and
initiating generation of an alert message in response to a detected error.

18. A method according to claim 17, wherein
said sequence identifier comprises a time stamp identifying a time of acquisition of the image relative to other images in said image sequence comprising said plurality of consecutive images.

* * * * *